(12) United States Patent
Cha

(10) Patent No.: US 7,092,213 B1
(45) Date of Patent: Aug. 15, 2006

(54) MULTIPLE LEVEL SURFACE CONFIGURATION FOR A SUB-AMBIENT PRESSURE AIR BEARING SLIDER

(75) Inventor: Ellis T. Cha, San Jose, CA (US)

(73) Assignee: SAE Magnetics (H.K.) Ltd., Shatin (HK)

( * ) Notice: Subject to any disclaimer, the term of this patent is extended or adjusted under 35 U.S.C. 154(b) by 0 days.

(21) Appl. No.: 09/406,330

(22) Filed: Sep. 27, 1999

Related U.S. Application Data (60) Provisional application No. 60/102,027, filed on Sep. 25, 1998.

(51) Int. Cl.
*G11B 15/64* (2006.01)
(52) U.S. Cl. .................................................. 360/235.4
(58) Field of Classification Search ............. 360/235.4, 360/236.3, 237
See application file for complete search history.

(56) References Cited

U.S. PATENT DOCUMENTS

| | | | | |
|---|---|---|---|---|
| 5,276,573 A | * | 1/1994 | Harada et al. | 360/103 |
| 5,872,686 A | * | 2/1999 | Dorius et al. | 360/236.3 |
| 6,021,020 A | * | 2/2000 | Itoh et al. | 360/103 |
| 6,137,656 A | * | 10/2000 | Levi et al. | 360/235.4 |
| 6,144,529 A | * | 11/2000 | Wada et al. | 360/236.1 |
| 6,157,519 A | * | 12/2000 | Kohira et al. | 360/245 |
| 6,459,546 B1 | * | 10/2002 | Mundt et al. | 360/236.3 |

FOREIGN PATENT DOCUMENTS

CN          1199902 A * 11/1998

* cited by examiner

*Primary Examiner*—David Davis
(74) *Attorney, Agent, or Firm*—Kenyon & Kenyon LLP (57) ABSTRACT

A slider design is presented including a first structure that extends between the rails of the slider body and over at least the first third of the slider body. A second structure having a depth lower than the depth of the first structure is disposed adjacent to the first structure and between the rails. The present slider design provides a stiff air bearing that has a near-constant flying height over various radii of the moving recording medium. The present slider design also provides exceptional lift-off in a ramp unloading operation.

12 Claims, 9 Drawing Sheets

Gap flying height tolerance (3 σ) in uIN:

|     | Low  | High | Low  | High |
|-----|------|------|------|------|
| ID  | 0.27 | 0.34 | 0.23 | 0.33 |
| MD  | 0.24 | 0.29 | 0.23 | 0.34 |
| OD  | 0.24 | 0.32 | 0.22 | 0.34 |

|  | ID | OD | ID | OD |
|---|---|---|---|---|
| Gram Load (u"/g) | -0.29 | -0.26 | -0.27 | -0.25 |
| PX (u"/mil) | -0.05 | -0.02 | -0.05 | -0.03 |
| PSA (u"/deg) | -0.11 | -0.05 | -0.11 | -0.05 |
| Crown (u"/u") | 0.09 | 0.14 | 0.14 | 0.20 |
| Step (u"/u") | 0.06 | 0.06 | 0.05 | 0.09 |

PX denotes dimple offset in pitch direction.

MULTIPLE LEVEL SURFACE CONFIGURATION FOR A SUB-AMBIENT PRESSURE AIR BEARING SLIDER

RELATED APPLICATIONS

This application claims priority to the extent available under 35 U.S.C. § 119(e)(1) to provisional application No. 60/102,027 filed Sep. 25, 1998.

BACKGROUND OF THE INVENTION

The present invention is directed to air bearing slider designs in disk drives. More particularly, the present invention pertains to a multiple level surface configuration for a subambient pressure air bearing slider.

Hard disk drives are common information storage devices essentially consisting of a series of rotatable disks that are accessed by magnetic reading and writing elements. These data transferring elements, commonly known as transducers, are typically carried by and embedded in a slider body that is held in a close relative position over discrete data tracks formed on a disk to permit a read or write operation to be carried out. In order to properly position the transducer with respect to the disk surface, an air bearing surface (ABS) formed on the slider body experiences a fluid air flow that provides sufficient lift force to "fly" the slider and transducer above the disk data tracks. The high speed rotation of a magnetic disk generates a stream of air flow or wind along its surface in a direction substantially parallel to the tangential velocity of the disk. The air flow cooperates with the ABS of the slider body which enables the slider to fly above the spinning disk. In effect, the suspended slider is physically separated from the disk surface through this self-actuating air bearing. The ABS of a slider is generally configured on the slider surface facing the rotating disk, and greatly influences its ability to fly over the disk under various conditions.

Some of the major objectives in ABS designs are to fly the slider and its accompanying transducer as close as possible to the surface of the rotating disk, and to uniformly maintain that constant close distance regardless of variable flying conditions. The height or separation gap between the air bearing slider and the spinning magnetic disk is commonly defined as the flying height. In general, the mounted transducer or read/write element flies only approximately a few micro-inches above the surface of the rotating disk. The flying height of the slider is viewed as one of the most critical parameters affecting the magnetic disk reading and recording capabilities of a mounted read/write element. For example, there are many advantages for reducing or having a relatively small flying height. A relatively small flying height allows the transducer to achieve greater resolution between different data bit locations and magnetic fields emanating from closely defined regions on the disk surface. Also, a low flying slider is known to provide improved high density recording or storage capacity of magnetic disks which is usually limited by the distance between the transducer and the magnetic media. Narrow separation gaps permit shorter wavelength signals to be recorded or read as a result. At the same time, with the increasing popularity of lightweight and compact notebook type computers that utilize relatively small yet powerful disk drives, the need for a progressively smaller slider body with a lower flying height has continually grown.

It has also been observed that a constant flying height provides desirable benefits which may be more readily achieved through particular ABS designs. Fluctuations in flying height are known to adversely affect the resolution and the data transfer capabilities of the accompanying transducer or read/write element. The amplitude of the signal being recorded or read does not vary as much when the flying height is relatively constant. Additionally, changes in flying height may result in unintended contact between the slider assembly and the magnetic rotating disk. Sliders are generally considered to be either direct contacting, pseudo-contacting or flying sliders which is descriptive of their intended contact with a rotating disk. Regardless of the type of slider, it is often desirable to avoid unnecessary contact with the surface of the spinning magnetic disk so as to reduce the wear on both the slider body and the disk. The deterioration or wear of the recording media may lead to the loss of recorded data, while slider wear may also result in the ultimate failure of the transducer or magnetic element.

What often causes changes to the flying height is the continual high speed movement of the slider across the rotating disk while performing read or write operations. For example, depending on the radial position of the slider, the respective linear velocity of the disk varies. Higher velocities are observed at the outer edge of the rotating disk, while lower velocities are found at the inner edge. As a result, the air bearing slider flies at different relative speeds at different radial positions relative to the disk. Because sliders typically fly higher at higher velocities, there is a tendency for flying heights to increase when positioned above the outer regions of the disk. At the same time, lower velocities at the inner regions of the disk cause the slider to fly lower. Accordingly, slider designs must account for the noticeable effect that variations in radial position, and relative velocity, have on the flying height.

The flying height of a slider is also adversely affected by changes in skew. The skew angle is defined and measured as the angle formed between the longitudinal axis of the slider body and the direction of the air flow tangential to the disk rotation. When the mounted slider is positioned near the inner or outer edges of the spinning disk, its longitudinal axis is often skewed in relation to the direction of the air flow. The longitudinal axis of the slider may be defined as a center line of reference running along the length of the slider body. These angular orientations or skew angles typically vary as a rotary actuator arm and gimbal suspension assembly turns about its pivot point thereby moving the slider in an arcuate path across the rotating disk. In view of the growing demand for compact disk drives having relatively smaller actuator arms, larger skew angles are ever more present because of the shortened arm length. It has often been observed that at skew values above zero, sliders are pressurized at reduced values which cause an undesirable decrease in flying height. Even a relatively moderate skew angle range adversely affects the flying capabilities of a slider. As a result, ABS designs continually attempt to minimize slider sensitivity to changes in skew.

Another fluctuation in flying height may be identified as slider roll. The roll angle is measured and defined by the difference in flying height between the longitudinal sides of the slider. Whenever a slider flies at skew with respect to the direction of the air flow, an unequal pressure distribution tends to occur between the ABS and the disk. This imbalance causes slider roll where one side of the slider body is closer to the disk surface than the other side. A slider, however, is preferably positioned at a constant slider roll regardless of any changes in the flying conditions including differences in tangential velocity between the inner and outer tracks of the rotating disk, and continuous lateral movement above the surface of the disk or varying skew angles.

In a common catamaran slider, a pair of parallel rails are formed on the slider body that extend along the outer edges of the slider surface facing the disk. Other ABS configurations including three or more additional rails, with various surface areas and geometries, have also been developed. The two rails typically run along at least a portion of the slider body length from the leading edge to the trailing edge. The leading edge is defined as the edge of the slider that the rotating disk passes before running the length of the slider towards a trailing edge. The leading edge may be tapered despite the large undesirable tolerance typically associated with this machining process. The transducer or magnetic element is typically mounted at some location along the trailing edge of the slider. The rails form an air bearing surface on which the slider flies, and provide the necessary lift upon contact with the air flow created by the spinning disk. As the disk rotates, the generated wind or air flow runs along underneath, and in between, the catamaran slider rails. As the air flow passes beneath the rails, the air pressure between the rails and the disk increases thereby providing positive pressurization and lift. Catamaran sliders generally create a sufficient amount of lift, or positive load force, to cause the slider to fly at appropriate heights above the rotating disk. In the absence of the rails, the large surface area of the slider body would produce an excessively large air bearing surface area. In general, as the air bearing surface area increases, the amount of lift created is also increased. Without rails, the slider would therefore fly too far from the rotating disk thereby foregoing all of the described benefits of having a low flying height. A flexible gimbal often provides the slider with multiple degrees of freedom such as vertical spacing, or pitch angle and roll angle which describe the flying height of the slider.

Although catamaran sliders are initially effective in providing an adequate flying height, they are especially sensitive to varying skew angle ranges and other adverse flying conditions. When the skew angle is increased, such as when the flying slider moves across the rotating disk, the air pressure distribution beneath the rails may become distorted. By accessing both inner and outer portions of a disk at relatively high speed, air is introduced in an uneven amount under each rail which typically causes slider roll. As a result, the slider experiences an uneven distribution of pressure which may cause the slider to roll in one direction such that the flying height is not uniform between the ABS rails. The mounted transducer may therefore be unable to operate effectively or accurately perform its data transfer operations. Regardless of the sensitivity of the ABS rails to various skew ranges and other adverse flying conditions, this rail design is widely acknowledged as a general configuration that provides effective pressurization or lift to enable a slider to fly.

In order to counteract the positive pressurization of the flying slider body to provide a low and constant flying height, it is known to form an ABS that also provides negative or subambient pressurization to pull or draw the slider body towards the disk. For example, negative pressure air bearing (NPAB) or self loading sliders have been known to provide a counteracting negative pressure load. In this dual pressurization scheme, the ABS may be generally formed with a leading edge, a trailing edge, side rails, and a cross-rail that extends between the side rails in a basic H-shaped orientation. The cross-rail, which is often positioned closer to the leading edge than the trailing edge of the slider, creates a subambient pressure region trailing the cross-rail and in between the side-rails. The subambient pressure region creates a negative pressure or load that counteracts the positive pressure generated along the side rail portion of the ABS. This counteraction of negative and positive forces has been known to increase the stability and air bearing stiffness of the slider, provide rapid slider take-off, and reduce its sensitivity to variations in conditions such as changing disk velocity and radial movement which cause fluctuations in flying height. The compensating changes in positive and negative pressure, in accordance with the varying velocity between the inner and outer tracks of the disk, contributes to the overall objective of maintaining a substantially constant and steady flying height. However, the offsetting forces created in a subambient pressurization scheme may often present undesirable effects that actually cause variations in flying height. A NPAB slider often exhibits noticeable roll as well, and a reduction in flying height at skewed conditions because of unequal pressurization or distribution of air beneath the rails.

Another type of ABS rail modification that has been developed is generally known as a transverse pressurization contour (TPC). A TPC may be formed on ABS rails at various locations along the edges of their air bearing surface areas. This has been observed to provide some reduction in flying height variations at skew angles in certain applications. When there is a transverse component of air flow directed across the face of the rail, the contour provided by a transverse edge of a TPC rail may experience positive pressurization while a counter balancing negative pressurization is produced in a contour along the other transverse edge of the rail. As a result, the overall pressure distribution across the ABS may remain relatively unchanged over some range of varying skew angles where the transverse component of air flow tends to cause unequal pressurization.

In a contact start stop (CSS) operation, the slider rests on the surface of the disk when the disk is not spinning and momentarily slides upon the surface of the disk as the disk spins up until the slider eventually flies above the surface of the disk. When the disk stops spinning, the slider once again rests on the surface of the disk. Alternatively, the slider can be loaded onto a ramp during non-operation. In this operation, it is intended that the slider never rest upon the disk. Instead, when no reading or writing operation is needed, the load beam (to which the slider is connected via a flexure) is rotated away from the recordable area of the disk to a point where it will contact the lower portion of an inclined ramp. The load beam is further rotated so that it will move up the incline of the ramp and away from the surface of the disk. As the load beam is moved away from the disk, the flexure as well as the slider are likewise urged away from the spinning disk.

All of the aforementioned ABS configurations and modifications for air bearing sliders attempt to achieve a low and constant flying height. Different degrees of effectiveness are provided by these ABS designs which overall do not control flying height, or pitch and roll angles very well. For example, many existing ABS designs have been observed to exhibit an extremely increased slider roll angle over outer tracks regions of a disk. These configurations also typically fail to control the increase in slider pitch angle when moving from inner track to the outer track regions. Thus, there exists a need for an ABS configuration for an air bearing slider that effectively maintains constant flying height and controls roll angle to achieve a greater "stiffness" to the air bearing regardless of constantly changing flying conditions such as the difference in relative velocity at the outer and inner regions of a disk, the relative positioning of a slider over a rotating disk, and varying skew angles ranges. There is also a need for an improved slider design that results in better loading and unloading in a ramp-loading disk drive.

SUMMARY OF THE INVENTION

According to an embodiment of the present invention, an improved slider design is presented including a first structure that extends between the rails of the slider body and over at least the first third of the slider body. A second structure having a depth lower than the depth of the first structure is disposed adjacent to the first structure and between the rails. The present slider design provides a stiffer air bearing that has a near-constant flying height over various radii of the moving recording medium. The present slider design also provides improved lift-off in a ramp unloading operation.

DETAILED DESCRIPTION

Figure 7:
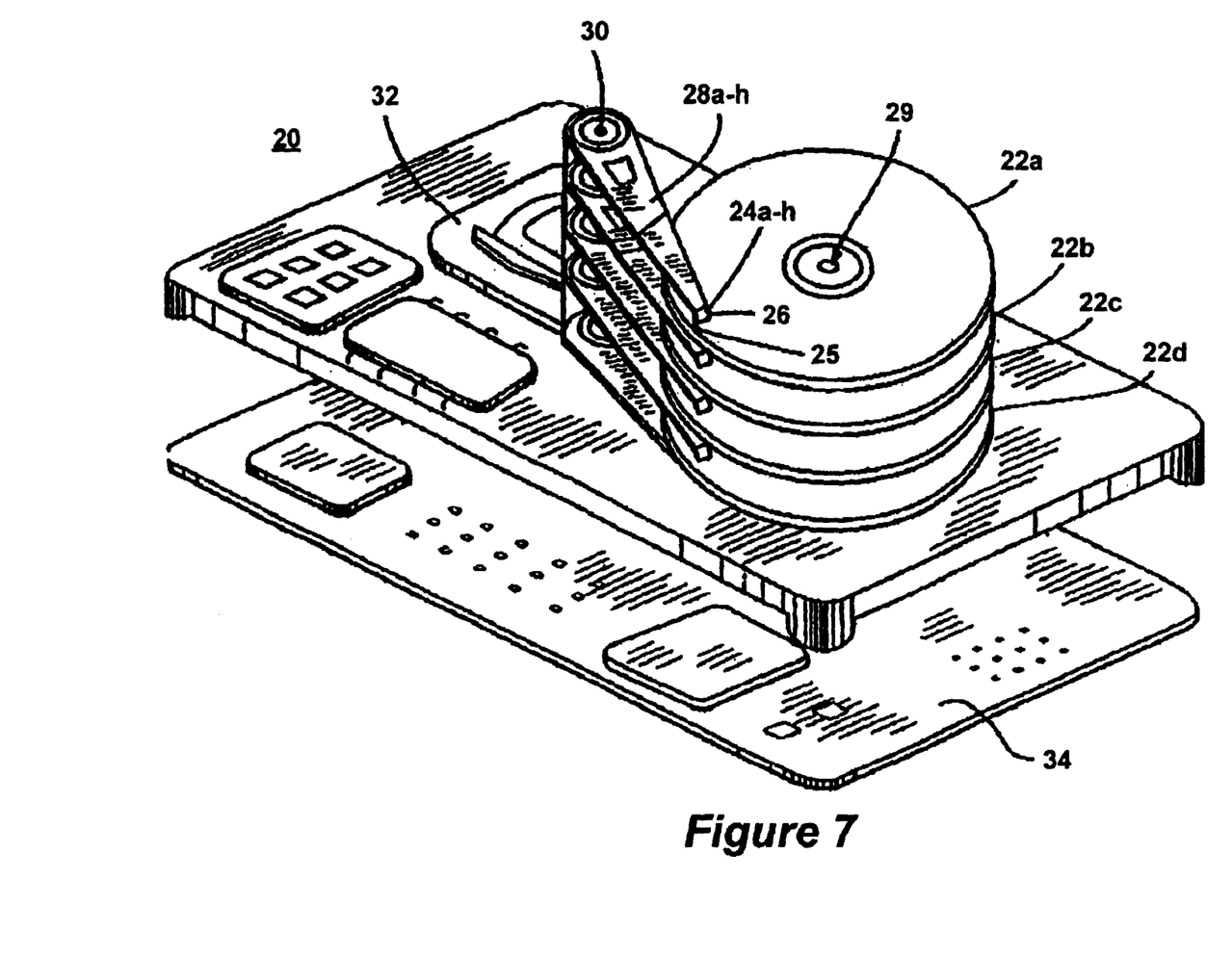
FIG. 7 is a diagram of a disk drive incorporating a slider designed according to an embodiment of the present invention.

Referring now to the drawings, and initially to FIG. 7, there is illustrated an example of a disk drive designated generally by the reference numeral 20 that may include the slider design of the present invention. The disk drive 20 includes a stack of storage disks 22a–d and a stack of read/write heads 24a–h. Each of the storage disks 22a–d is provided with a plurality of data tracks to store user data. As illustrated in FIG. 7, one head is provided for each surface of each of the disks 22a–d such that data can be read from or written to the data tracks of all of the storage disks. The heads are coupled to a pre-amplifier. It should be understood that the disk drive 20 is merely representative of a disk drive system utilizing the present invention and that the present invention can be implemented in a disk drive system including more or less storage disks.

The storage disks 22a–d are mounted for rotation by a spindle motor arrangement 29, as is known in the art. Moreover, the read/write heads 24a–h are supported by respective actuator arms 28a–h for controlled positioning over preselected radii of the storage disks 22a–d to enable the reading and writing of data from and to the data tracks. To that end, the actuator arms 28a–h are rotatably mounted on a pin 30 by a voice coil motor 32 operable to controllably rotate the actuator arms 28a–h radially across the disk surfaces.

Figure 8:
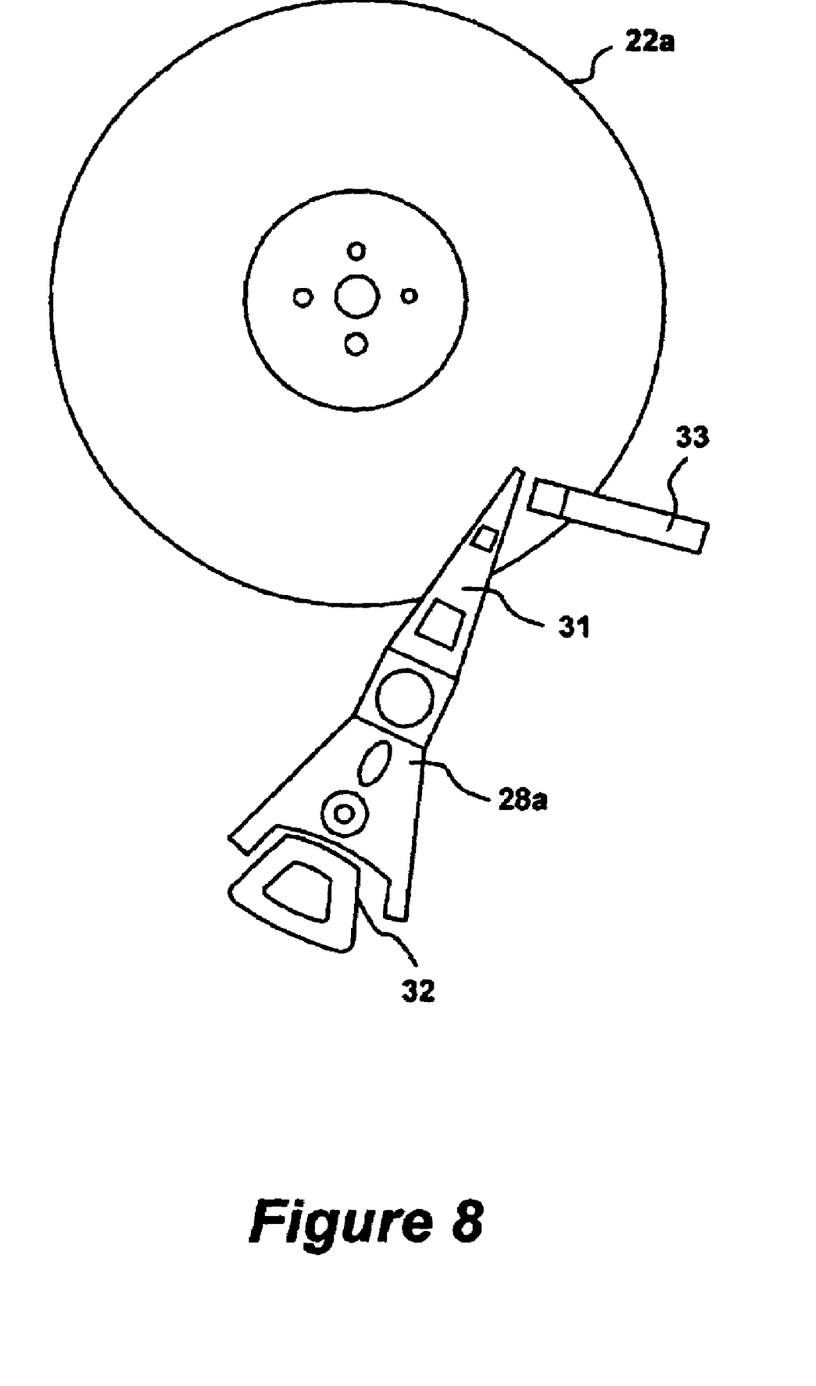
FIG. 8 is a diagram of an actuator arm adapted to hold a slider designed according to an embodiment of the present invention.

Referring to FIG. 8, each of the read/write heads 24a–h is mounted to a head suspension assembly of the respective actuator arm 28a–h by a flexure element and comprises a magnetic transducer 25 mounted to a slider 26 having an air bearing surface (not shown in this figure), all in a known manner. As discussed in further detail below, the sliders 26 cause the magnetic transducers 25 of the read/write heads 24a–h to "fly" above the surfaces of the respective storage disks 22a–d for non-contact operation of the disk drive system, as discussed above. When not in use, the voice coil motor 32 rotates the actuator arms 28a–h to a ramp 33, and a load beam of the actuator arms 28a–h moves up the load beam to a resting position away from the storage disk surfaces.

Figure 1A:
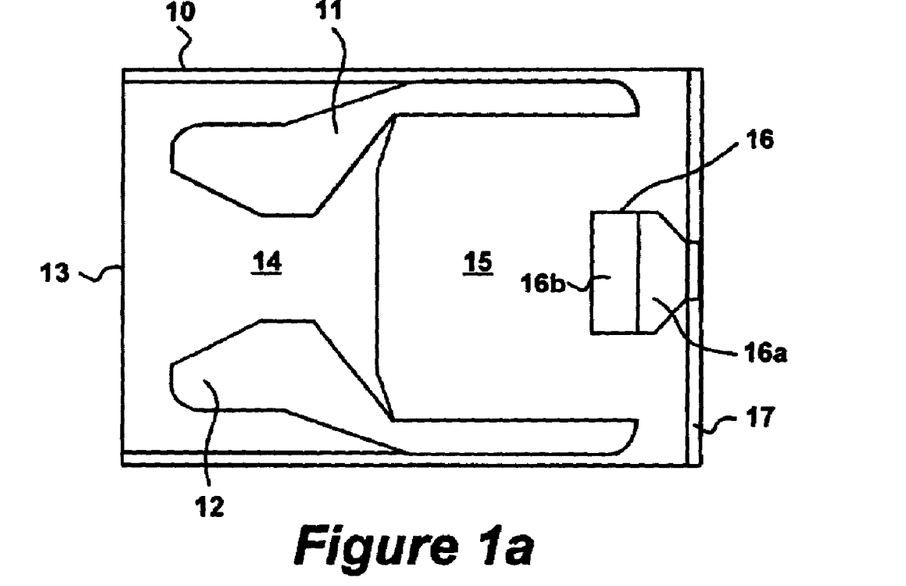
FIGS. 1a–b are plan views of sliders having a configuration according to embodiments of the present invention.
Figure 1B:
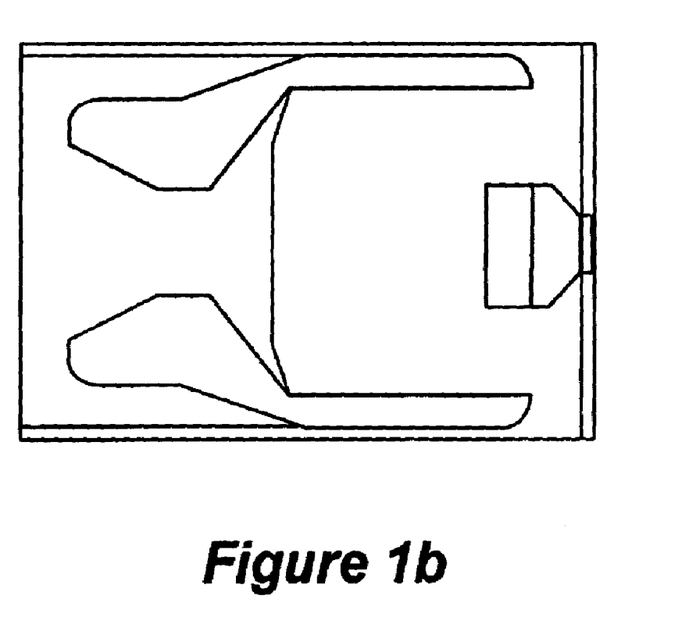

Embodiments of the slider design of the present invention are shown in FIGS. 1a and 1b. The slider design of FIGS. 1a and b provides a sub-ambient pressure slider with a rear-compression pad. A shallow leading edge is provided with an open front end that offers an improved loading and unloading of the slider in the so-called "ramp" design. The slider design is also optimized to provide improved air-bearing stiffness.

First and second embodiments of the slider design are shown in FIGS. 1a and 1b in plan views. Referring to FIG. 1a, the slider 10 includes first and second rails 11 and 12 which provide air bearing surfaces when the slider is placed proximately to a moving magnetic medium (e.g., a rotating disk in a hard disk drive). At the leading edge 13 of the slider, the slider is etched or otherwise modified to provide a first structure 14 having a first depth relative to the height of the rails 11 and 12. In this embodiment, first structure 14 extends to the outside, the inside and leading edges of the rails 11 and 12. A second structure 15 is provided between the rails 11 and 12 and is etched to a depth that is greater than the first structure. In this embodiment, the first structure 14 is etched to a depth of between 5 to 10 microinches and the second structure 15 is etched to a depth of 60–120 microinches. Also, the second structure 15 begins more than one-third of the entire length from the leading edge of the slider and preferably begins from one-third to two-thirds of the entire length from the leading edge of the slider. A rear compression pad 16 may be provided which includes a first surface 16a at a height equal to the height of the first and second rails and a third structure 16b having a third depth. In this embodiment, the third depth is equal to the first depth of the first structure 14. As known in the art, a layer of alumina 17 can be provided for inclusion of a magnetic read/write apparatus (e.g., an MR head). In the second embodiment of FIG. 1b, the slider design is modified slightly by providing a different shaping of the rails.

Figure 2A:
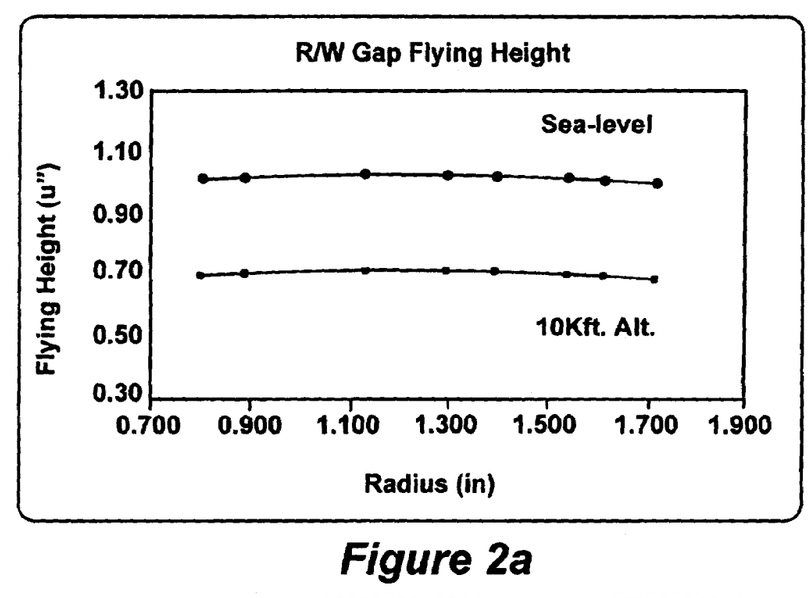
FIGS. 2a–b are graphs showing relative flying heights between the respective sliders of FIGS. 1a–b over various radii of a moving recording medium at different atmospheric pressures.
Figure 2B:
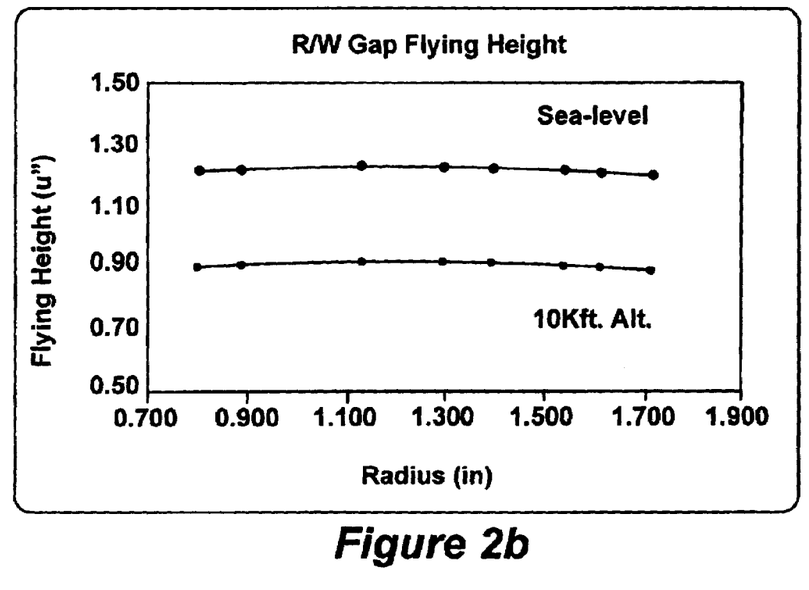
Figure 3:
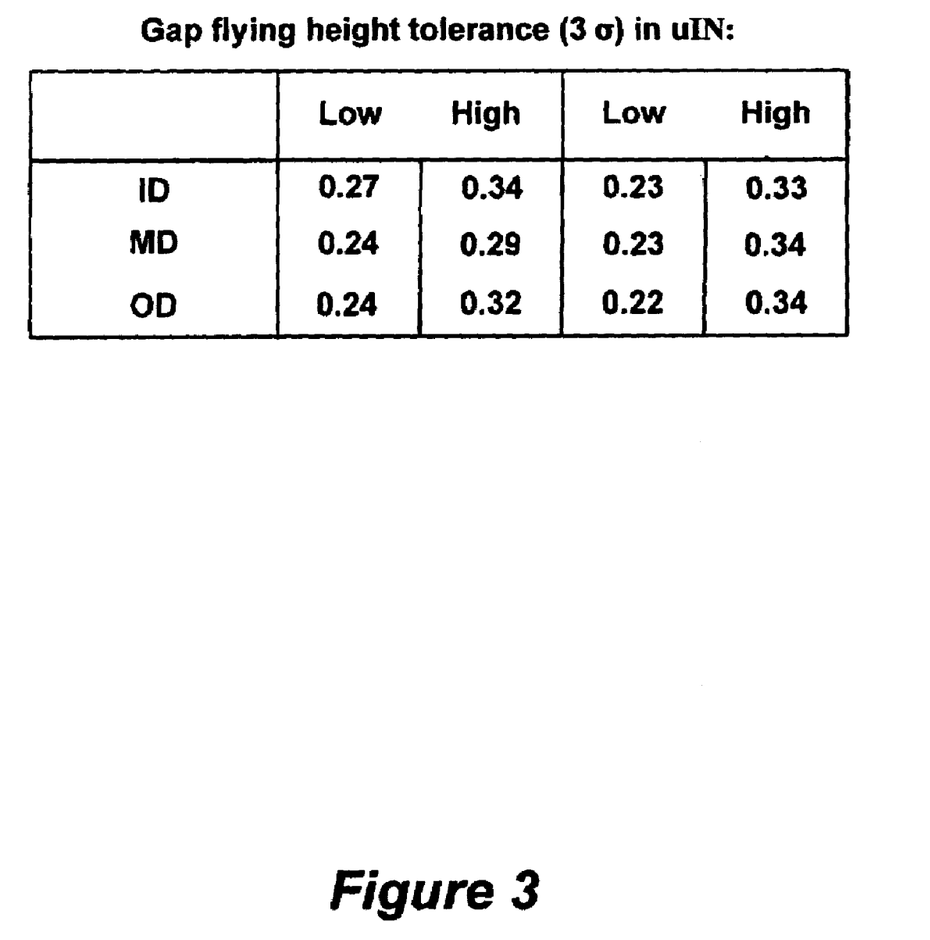
FIG. 3 is a graph of the flying height tolerances for the sliders of FIGS. 1a and 1b

Referring to FIGS. 2a and 2b, the flying height for the sliders of FIGS. 1a and 1b is shown over a variety of radii for a moving magnetic disk. As seen in these figures, the slider design provides a flying height that does not appreciably fluctuate over the different radii of the disk. Further to FIGS. 2a and 2b, FIG. 3 shows the flying height tolerances for the sliders of FIGS. 1a and 1b.

Figure 4:
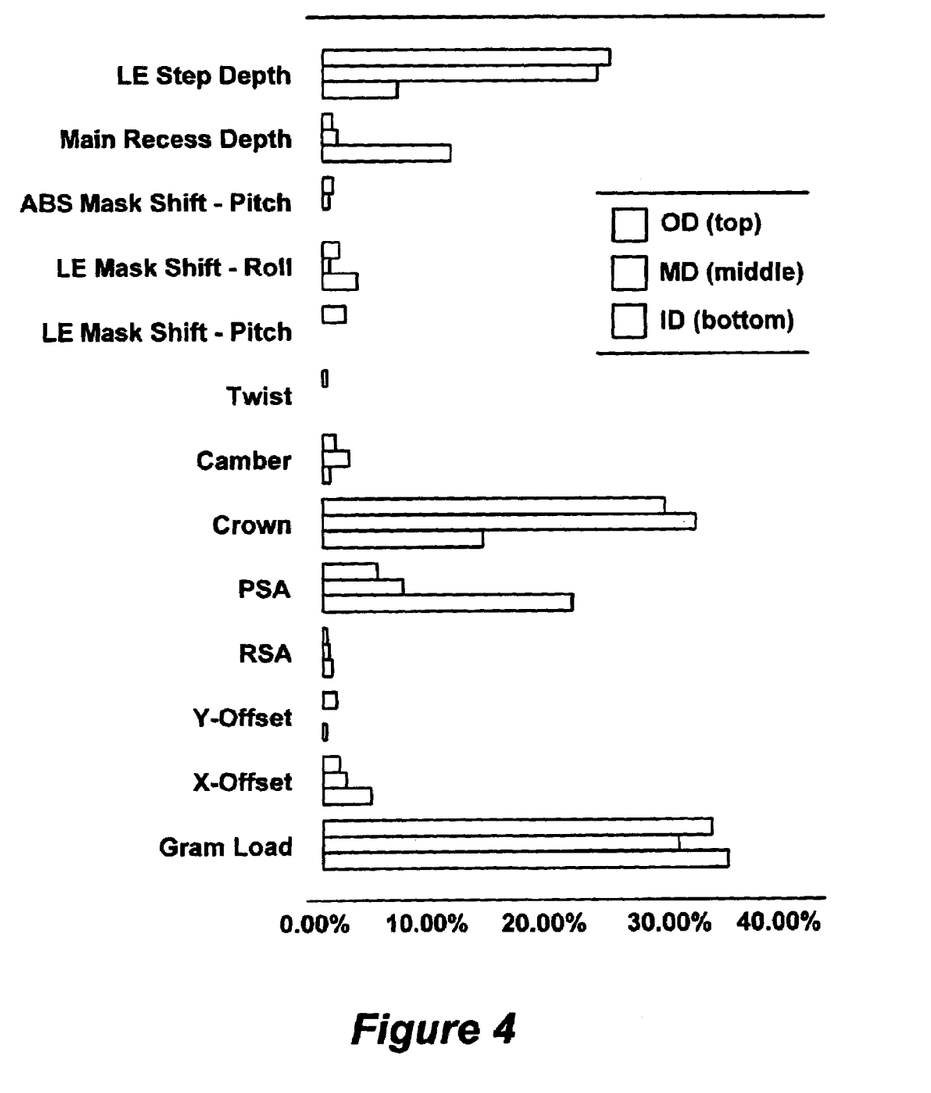
FIG. 4 is a graph showing the contributions of various features of the sliders of FIGS. 1a and 1b to the overall flying height at different radii of the moving recording medium.

Referring to FIG. 4, the contributions of various features of the sliders of FIGS. 1a and 1b to the overall flying height at different diameters are shown. For example, the gram load of the slider contributes about 30% to the total flying height of the sliders of FIGS. 1a and 1b at the middle diameter.

Figure 5:
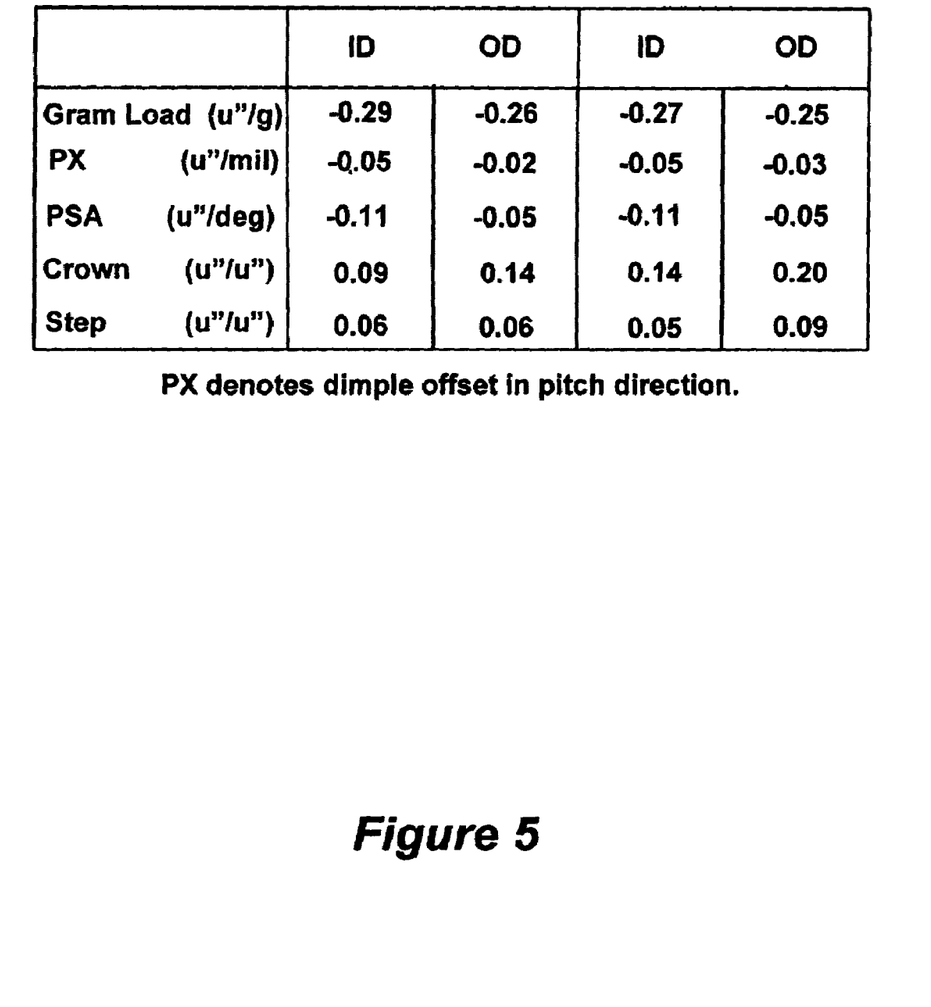
FIG. 5 is a graph showing air bearing sensitivities for various features of the sliders of FIGS. 1a and 1b.

Referring to FIG. 5, air bearing sensitivities for various features of the sliders of FIGS. 1*a* and 1*b* are shown. These values reflect the relative "stiffness" of the air sliders of FIGS. 1*a* and 1*b*.

Figure 6A:
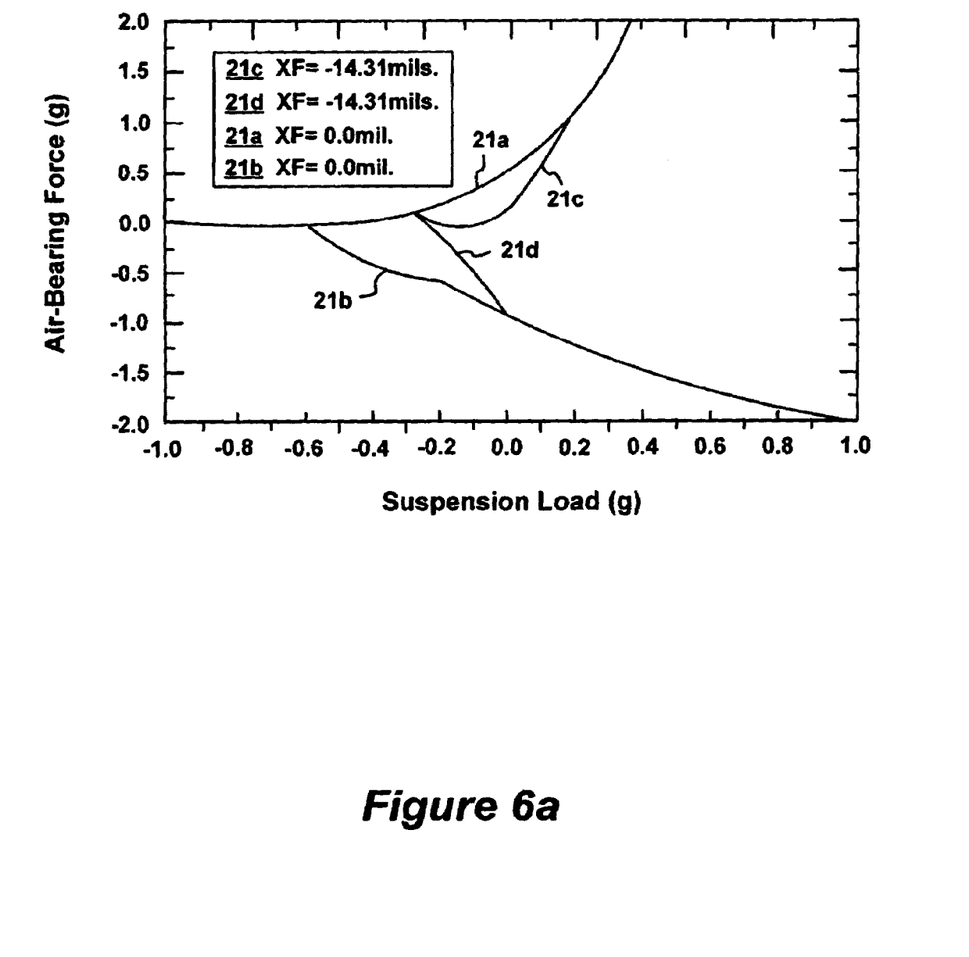
FIGS. 6a–b are graphs depicting an unloading event for the slider design of FIGS. 1a and 1b.
Figure 6B:
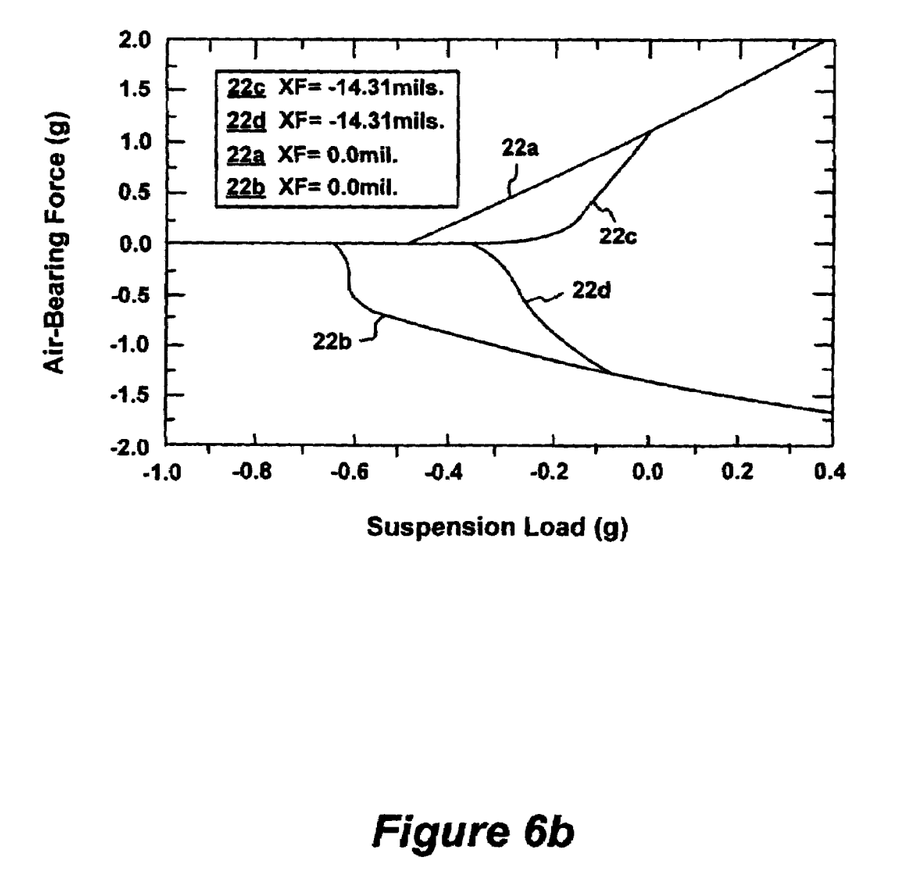

Referring to FIG. 6*a*, a graph is shown depicting an unloading event for the slider design of the first embodiment. In a first example, shown with the lines 21*a–b*, the center of the suspension load on the slider is at the center of gravity for the slider. In the second example, shown with the lines 21*c–d*, the center of the suspension load is at a point 14.31 mils away from the center of gravity for the slider (toward the leading edge of the slider). As shown in FIG. 6*a*, as the suspension force decreases during an unload operation, the magnitude of the suction force provided by the negative pressure region of the slider also decreases. The slider lifts off from the moving disk when the two lines meet. With the slider design of FIG. 11*a*, the slider unloads from the moving disk before the suspension load reaches −0.6 grams (the larger in magnitude of the suspension load during lift-off, the greater the possibility that damage to the suspension will occur). Because the slider design of the present invention lifts-off faster, there is less of a chance that the slider will stay at its regular flying height as it moves past the outermost diameter of the disk during the unload operation. A similar graph is shown in FIG. 6*b* for the slider design of FIG. 1*b* (with corresponding lines 22*a–d*). Accordingly, the slider design of FIGS. 1*a* and 1*b* provides an improved unloading operation in part because the sub-ambient pressure region form by second structure 15 is placed towards the rear of the first and second rails 11 and 12.

Although embodiments are specifically illustrated and described herein, it will be appreciated that modifications and variations of the present invention are covered by the above teachings and within the purview of the appended claims without departing from the spirit and intended scope of the invention. For example, though the slider design demonstrates excellent results with so-called 30% sliders, the present invention can be implemented in slider designs of other dimensions.

What is claimed is:

1. A slider comprising:
   a slider body;
   first and second rails extending in a longitudinal direction along the slider body where leading edges of said rails are spaced from a leading edge of the slider body;
   a first structure having a first depth and extending from said leading edge of the body to the leading edges of the first and second rails and between the first and second rails;
   a second structure having a second depth disposed adjacent to said first structure and between said first and second rails, said second depth being lower than said first depth; and wherein said second structure begins more than one-third of the length of the slider body from the leading edge of the slider body; and
   a compression pad disposed proximately to a trailing edge of said slider body, said compression pad having a height equal to a height of said first and second rails and said compression pad including a third structure having a depth equal to the first depth.

2. The slider of claim 1
   wherein said first and second rails are generally closer to one another near the leading edge than near the trailing edge.

3. A slider comprising:
   a slider body;
   first and second rails extending in a longitudinal direction along the slider body;
   a first structure having a first height and extending from a leading edge of the body and between the first and second rails;
   a second structure having a second height disposed adjacent to said first structure and between said first and second rails, said second height being lower than said first height; and wherein said second structure begins more than one-third of the length of the slider body from the leading edge of the slider body; and
   a compression pad disposed proximately to a trailing edge of said slider body, said compression pad having a height equal to a height of said first and second rails and said compression pad including a third structure having a height equal to the first height.

4. The slider of claim 3
   wherein said first and second rails are generally closer to one another near the leading edge than near the trailing edge.

5. A head suspension assembly comprising:
   a flexure; and
   a slider coupled to said flexure, said slider including
   a slider body;
   first and second rails extending in a longitudinal direction along the slider body where leading edges of said rails are spaced from a leading edge of the slider body;
   a first structure having a first depth and extending from said leading edge of the body to the leading edges of the first and second rails and between the first and second rails;
   a second structure having a second depth disposed adjacent to said first structure and between said first and second rails, said second depth being lower than said first depth; and wherein said second structure begins more than one-third of the length of the slider body from the leading edge of the slider body; and
   a compression pad disposed proximately to a trailing edge of said slider body, said compression pad having a height equal to a height of said first and second rails and said compression pad including a third structure having a depth equal to the first depth.

6. The head suspension of claim 5
   wherein said first and second rails are generally closer to one another near the leading edge than near the trailing edge.

7. A head suspension assembly comprising:
   a flexure;
   a slider coupled to said flexure, said slider including
   a slider body;
   first and second rails extending in a longitudinal direction along the slider body;
   a first structure having a first height and extending from a leading edge of the body and between the first and second rails;
   a second structure having a second height disposed adjacent to said first structure and between said first and second rails, said second height being lower than said first height; and wherein said second structure begins more than one-third of the length of the slider body from the leading edge of the slider body; and
   a compression pad disposed proximately to a trailing edge of said slider body, said compression pad having a height equal to a height of said first and second rails and said compression pad including a third structure having a height equal to the first height.

8. The head suspension of claim 7
wherein said first and second rails are generally closer to one another near the leading edge than near the trailing edge.

9. A disk drive comprising:
a recording medium adapted to be rotated at a given velocity;
a flexure;
a slider coupled to said flexure and adapted to fly above said recording medium when rotated, the slider including
a slider body;
first and second rails extending in a longitudinal direction along the slider body where leading edges of said rails are spaced from a leading edge of the slider body;
a first structure having a first depth and extending from said leading edge of the body to the leading edges of the first and second rails and between the first and second rails;
a second structure having a second depth disposed adjacent to said first structure and between said first and second rails, said second depth being lower than said first depth; and wherein said second structure begins more than one-third of the length of the slider body from the leading edge of the slider body; and
a compression pad disposed proximately to a trailing edge of said slider body, said compression pad having a height equal to a height of said first and second rails and said compression pad including a third structure having a depth equal to the first depth.

10. The disk drive of claim 9
wherein said first and second rails are generally closer to one another near the leading edge than near the tailing edge.

11. A disk drive comprising:
a recording medium adapted to be rotated at a given velocity;
a flexure;
a slider coupled to said flexure and adapted to fly above said recording medium when rotated, the slider including
a slider body;
first and second rails extending in a longitudinal direction along the slider body;
a first structure having a first height and extending from a leading edge of the body and between the first and second rails;
a second structure having a second height disposed adjacent to said first structure and between said first and second rails, said second height being lower than said first height; and wherein said second structure begins more than one-third of the length of the slider body from the leading edge of the slider body; and
a compression pad disposed proximately to a trailing edge of said slider body, said compression pad having a height equal to a height of said first and second rails and said compression pad including a third structure having a height equal to the first height.

12. The disk drive of claim 11
wherein said first and second rails are generally closer to one another near the leading edge than near the trailing edge.

* * * * *

UNITED STATES PATENT AND TRADEMARK OFFICE
CERTIFICATE OF CORRECTION

PATENT NO. : 7,092,213 B1  Page 1 of 1
APPLICATION NO. : 09/406330
DATED : August 15, 2006
INVENTOR(S) : Ellis T. Cha It is certified that error appears in the above-identified patent and that said Letters Patent is hereby corrected as shown below:

Column 7, line 17: "11a" should be --1a--

Signed and Sealed this

Fifth Day of December, 2006

JON W. DUDAS
*Director of the United States Patent and Trademark Office*